W. C. RIEBE.
TIRE CASING.
APPLICATION FILED MAR. 30, 1917.
1,238,715. Patented Aug. 28, 1917.
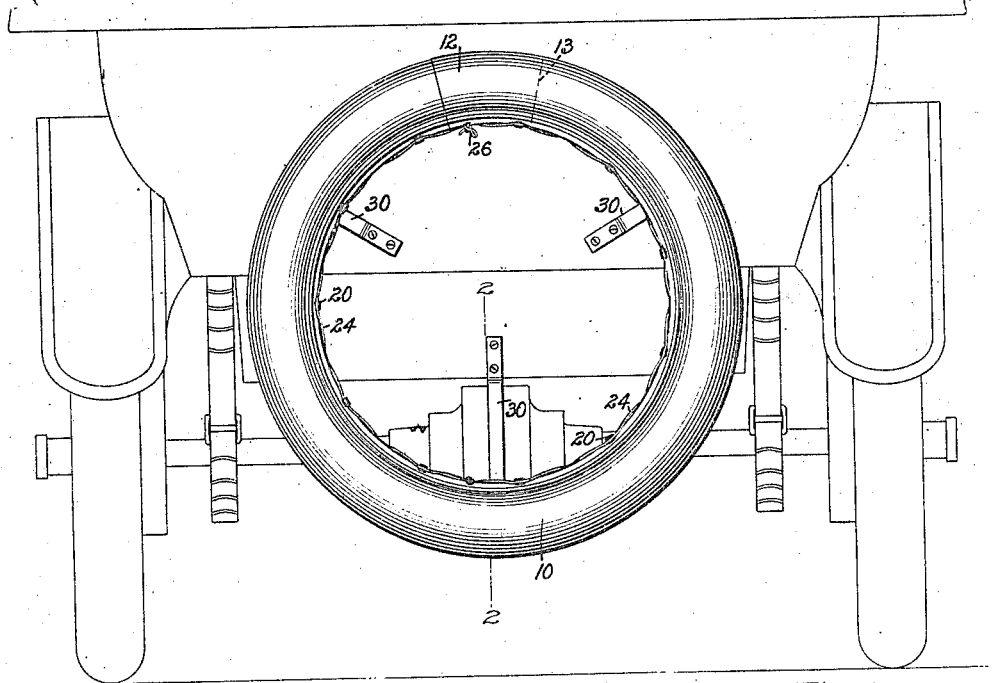
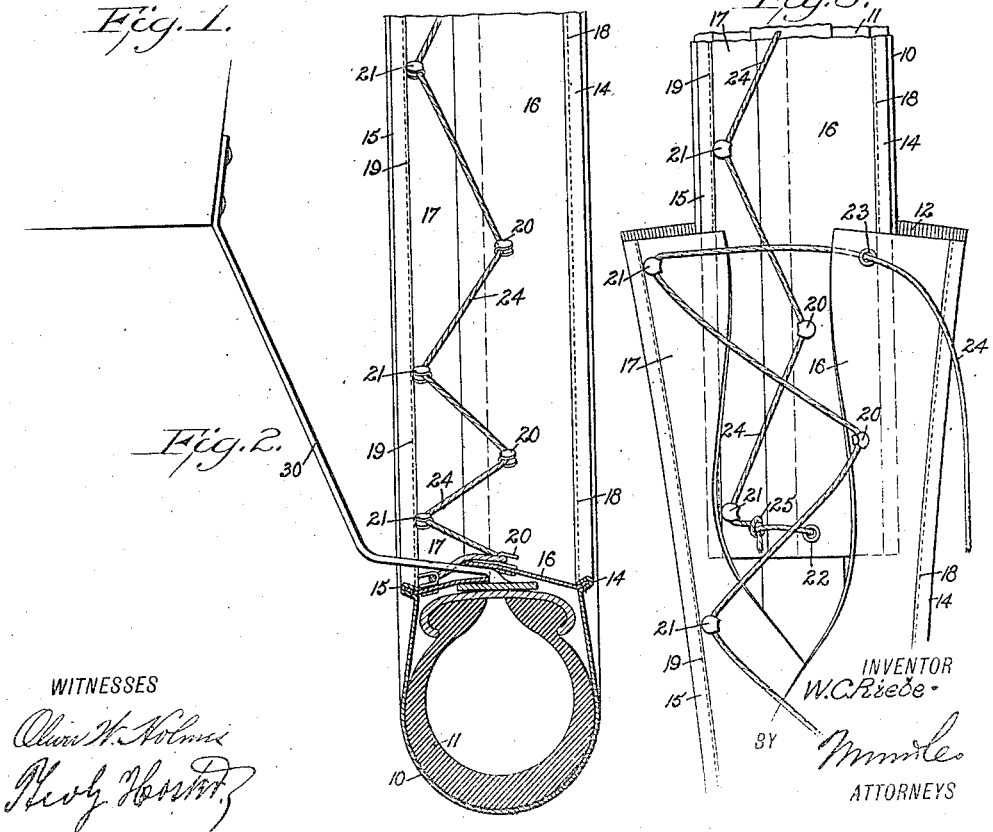
WITNESSES
INVENTOR
W. C. Riebe
BY
ATTORNEYS

UNITED STATES PATENT OFFICE.

WALTER C. RIEBE, OF NEW YORK, N. Y.

TIRE-CASING.

1,238,715.
Specification of Letters Patent.
Patented Aug. 28, 1917.

Application filed March 30, 1917. Serial No. 158,691.

*To all whom it may concern:*

Be it known that I, WALTER C. RIEBE, a citizen of the United States, and a resident of the city of New York, borough of the Bronx, in the county of Bronx and State of New York, have invented a new and Improved Tire-Casing, of which the following is a full, clear, and exact description.

The invention relates to containers for extra tires of automobile wheels, and its object is to provide a new and improved tire casing arranged to safely house and protect an automobile tire of the usual demountable or clencher type having a non-skid or a plain tread, and such as are now generally used. Another object is to permit of conveniently and quickly placing the tire in position in the casing or removing it therefrom whenever it is needed.

In order to accomplish the desired result, use is made of an open ring-shaped body made approximately U shape in cross section and having its ends overlapping or telescoping, closing flaps attached to the inner edges of the said body and extending transversely in overlapping relation one to the other, and fastening means fastening the said flaps together.

A practical embodiment of the invention is represented in the accompanying drawings forming a part of this specification, in which similar characters of reference indicate corresponding parts in all the views.

Figure 1 is a face view of the casing with a tire inclosed therein and mounted on the rear end of an automobile.

Fig. 2 is an enlarged cross section of the same on the line 2—2 of Fig. 1; and

Fig. 3 is a face view of a portion of the casing at the telescoping ends thereof and with the overlapping flaps of one end partly open.

The tire casing is preferably made of a suitable waterproof flexible fabric and it consists essentially of a body 10 in the form of an open ring which is U shape in cross section to permit of conveniently placing the tire 11 in position in the casing or removing it therefrom, it being understood that the body 10 snugly fits around the peripheral face of the tire 11, as plainly indicated in the drawings. The ends 12 and 13 of the body 10 overlap or telescope one relative to the other thus providing a tight joint, as will be readily understood by reference to Figs. 1 and 3. It will also be noticed that by the overlapping ends 12 and 13 it is possible to house tires 11 of different sizes without exposing the tire. The inner edges 14 and 15 of the body 10 are doubled up and extend outwardly at angles to the sides of the body, as plainly indicated in Fig. 2, and between the doubled-up edges 14 and 15 extend the outer edges of closing flaps 16 and 17 extending transversely and overlapping one the other so as to close the body at the inner sides thereof. The outer edges of the flaps 16 and 17 are fastened in position in the double-up inner edges of the body 10 by stitches 18 and 19, or other suitable fastening devices. The flaps 16 and 17 are made of the same material as the body 10 to permit of conveniently opening the flaps to allow of placing the tire 11 in position in the body or removing it therefrom.

In order to draw the body 10 tight around the tire 11 and to fasten the flaps 16 and 17 in overlapping relation, suitable fastening devices may be employed, preferably, however, lacing studs 20 and 21 secured alternately on the outer faces of the flaps 16 and 17, as plainly shown in the drawings. The ends of the flaps 16 are provided with eyelets 22, 23, of which the eyelet 22 is engaged by one end of a lacing string 24 tied by a suitable knot or loop 25 to this end of the flap 16, as shown in Fig. 3. The lacing string 24 is engaged with the alternating studs 21, 20 to draw the flaps 16 and 17 tight in a transverse direction, and the lacing string 24 after engaging the last stud 21 on the flap 17 is passed through the other eyelet 23, and after drawing the lacing string taut it is tied into a knot 26 (see Fig. 1) or otherwise fastened in place, to hold the flaps 16 and 17 securely fastened together in overlapping relation.

It will be noticed that the tire 11 is safely housed in the casing and is completely protected against rain, snow, dust or other extraneous matter.

It will also be noticed that the terminals of the retaining brackets 30 for supporting the casing with the tire therein on the back of an automobile can be readily passed between the flaps 16 and 17 to engage the tire and thus hold the same firmly supported on the back of the automobile.

It is well known that when ordering any other make of tire casing, the person buying same must give the name of car, model, year, rim and what kind of tread and tire, All this must be known to obtain any other make of shoe casing as now generally constructed. In ordering my tire casing all that is to be known is the size of the tire the casing is to be made for.

It will be noticed that in my reinforced tire casing no buttons are needed on the tread strip where the overlap forms, thus doing away with all stretching and injuring of the hand and knuckles, while in the other tire casings they must be stretched in order to make a neat appearance.

Casings or covers of other makes must be cut away on the inside strip in order to make the casing or cover fit around the arms projecting from the rear of the car to which a ring is fastened in order to hold the shoe and rim. By cutting these casings or covers it is impossible for them to be dust or water-proof as the openings are too large to protect the rim or shoe and the rim eventually will become rusty and the shoe is liable to rot. Whereas in my improved casing no part thereof needs to be cut out in order to make it fit around holders or projecting arms, thus rendering the casing weather-proof.

Having thus described my invention, I claim as new and desire to secure by Letters Patent:—

1. A casing for holding extra automobile tires, comprising an open ring shaped body approximately U-shaped in cross section and having its ends overlapping, the edges of the said body being doubled up and extending outwardly at angles to the sides of the body, closing flaps having their outer edges secured to the doubled up edges of the body and extending transversely in overlapping relation one to the other, the outer flap being provided with an eyelet at one end and with studs arranged a short distance from its free edge and the inner flap with studs arranged adjacent to its connection with the body, and a lacing secured to the end of the outermost flap opposite that having the eyelet, said lacing engaging the studs and passing through the said eyelet.

2. A casing for holding extra automobile tires, comprising an open ring-shaped body made approximately U shape in cross section and having its ends overlapping, the inner edges of the said body being doubled up and extending outwardly at angles to the sides of the body, closing flaps having their outer edges extending between the doubled-up edges of the said body, the closing flaps extending transversely in overlapping relation one to the other, the outer flap being provided with an eyelet at each end, means fastening the said outer flap edges in position in the said doubled-up edges of the body, lacing studs secured alternately to the outer faces of the flaps, the studs of the inner flap being adjacent its connection with the body and the studs of the outer flap being a short distance from its free edge, and a lacing string attached at one end to one of the eyelets and engaging the said lacing studs, the other end of the string passing through the other eyelet.

WALTER C. RIEBE.